April 6, 1965    E. L. SANKEY    3,177,480
ELECTRIC LINE FAULT INDICATOR
Filed Feb. 8, 1961    2 Sheets-Sheet 1

INVENTOR.
EDWARD L. SANKEY
BY James T Ryan
ATTORNEY

April 6, 1965  E. L. SANKEY  3,177,480
ELECTRIC LINE FAULT INDICATOR
Filed Feb. 8, 1961  2 Sheets-Sheet 2

INVENTOR.
EDWARD L. SANKEY
BY
James T. Ryan
ATTORNEY

United States Patent Office 3,177,480
Patented Apr. 6, 1965

3,177,480
ELECTRIC LINE FAULT INDICATOR
Edward L. Sankey, Oak Creek, Wis., assignor to McGraw-Edison Company, Milwaukee, Wis., a corporation of Delaware
Filed Feb. 8, 1961, Ser. No. 87,882
12 Claims. (Cl. 340—253)

This invention relates generally to a device for indicating a faulted condition on a line and more particularly to an electro-mechanical fault indicator which is capable of being re-set after indicating a faulted condition so that the device may be used over and over again to perform its indicating function.

As electrical distribution systems become longer and more inaccessible due to rough terrain and underground systems the location of faults along such lines becomes more difficult. This is occurring at a time when system economy and public relations demand that outage time be kept to a minimum. In general when a line becomes grounded or otherwise short circuited a back up device operates to isolate a section of line. The isolated section then must be painstakenly patrolled on foot to locate the fault. During this rather tedious inspection of the conductor length many consumers are off the line; a situation which inconveniences the consumer and lowers utility revenues.

One commonly used modification of the above system involves the placement of sectionalizing switches at line taps and at intervals on the line so that each particular section of the faulted line may be tested by trial reclosure of the station breaker. This type of procedure materially cuts patrolling time since only a small portion of the line need be patrolled but it involves a good deal of time in determining the faulted section of the line and requires the station breaker to go thru additional duty cycles.

Another method of determining faulted line sections involves the utilization of electronic testing equipment but this method is also time consuming and on certain occasions most inaccurate. As is readily apparent none of the foregoing approaches to the problem of determining faulted line sections is particularly applicable to underground distribution systems.

It is therefore an object of this invention to provide a fault indicator which is inexpensive and which will give a visible indication of a faulted section of line without the necessity of having to patrol the entire length of the line.

Another object of this invention is to provide a fault indicator of simple and fool-proof construction which is capable of easily being re-set and which operates under all weather conditions.

Another object of this invention is to provide a fault indicator of low cost which may be utilized in conjunction with existing underground distribution systems.

A further object is to provide a fault indicator which may be utilized in conjunction with reclosers and breakers to indicate which phase of a multi-phase system is faulted.

A still further object of certain modifications of the invention is to provide a fault indicator which will automatically re-set itself after a temporary fault.

Other objects and advantages of this invention will be apparent from the following description of the preferred embodiments of the invention taken in connection with the accompanying drawings in which.

Figure 1:
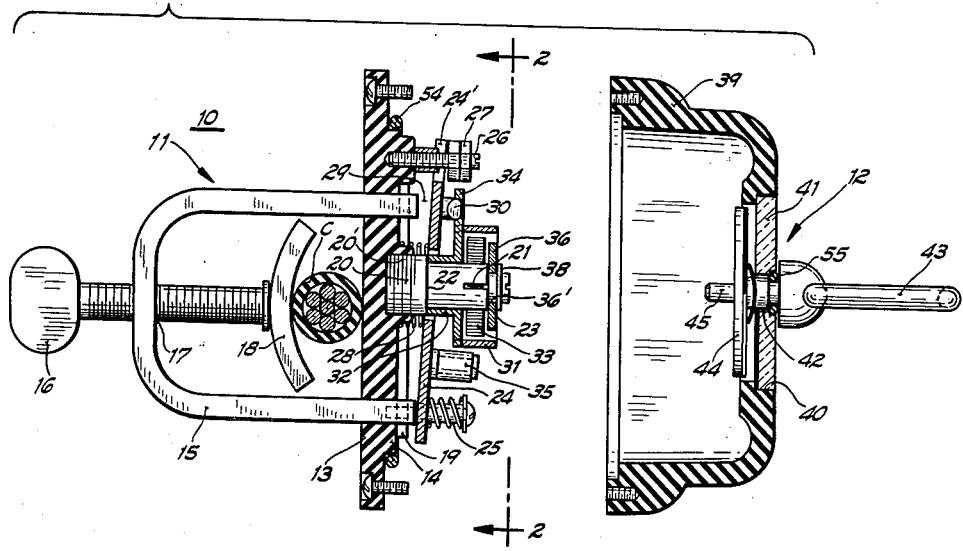
FIG. 1 is a partially cutaway exploded view in elevation.
Figure 2:
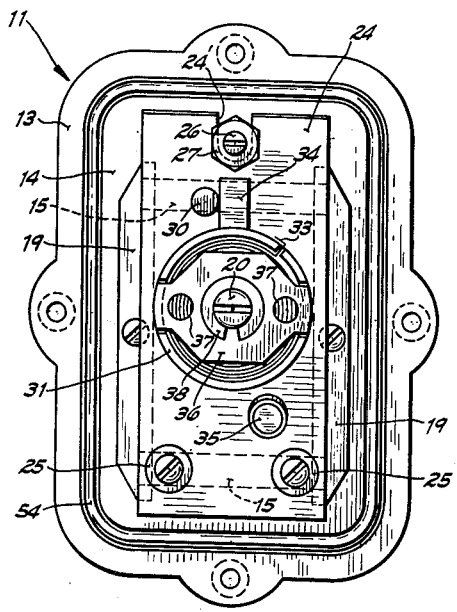
FIG. 2 is a frontal elevation view of a portion of the device taken along lines 2—2 of FIG. 1.

Referring now to FIGURES 1 and 2 the fault indicator is indicated generally at 10 and comprises a yoke and armature assembly 11 and an indicating assembly 12. The yoke and armature assembly 11 comprises a casing backing member 13 having a raised inner portion 14 and a U-shaped core (yoke) member 15 which has the legs thereof projecting thru the backing member 13 and thru the raised inner portion 14. The casing backing member 13 and casing yet to be described may be constructed of high-strength phenolic resin or the like.

A thumb screw 16 is received in threaded aperture 17 in the base of core member 15 and has at its inward end, affixed thereto, a curvate cable clamp 18 which is adapted to bias a variety of conductor sizes (C) against the back of the casing backing member 13.

The legs of the core member which project thru the backing member 13 may be joined together by non-magnetic strips 19 which are affixed to the raised portion 14 of the member and which serve to affix the core to the backing member and to impart mechanical strength to the structure. An immobile shaft 20 having screw threads 20′ on one end thereof is affixed to the backing member. The shaft 20 is provided with a central slot 21 at its other end and with intermediate shoulder portions 22 and 23. A compression spring 28 fits over the shaft 20 and rests against the raised portion 14 of the backing member 13. An apertured armature plate 24 is fitted over the shaft 20 so that the spring 28 abuts thereagainst. The armature plate 24 is pivotally attached at one end to the core member 15 by means of spring loaded bolt assemblies 25 or any suitable hinge means. However the spring loaded bolt construction is preferred since it involves a minimal air gap distance between the plate and the core. The advantage of this will be subsequently explained. The other end of the armature plate 24 has a notched peripheral portion 24′ which rides on a guide member 26 which projects from the backing member 13. Motion of the plate along the guide member 26 is limited by the leg portion of the yoke 15 which projects thru the raised portion 14 and by nuts 27 which are positioned on the end of the guide member 26.

It can be seen that the compression spring 28 normally serves to keep the "free" end (notched end) of the armature 24 biased away from the protruding portion of the yoke thereby creating an air gap 29 therebetween. By adjusting the nuts 27 on the guide member 26 the air gap distance may be varied. Near the free end of the plate 24 and near the other end of the plate, on the side away from the core 15, are positioned respectively, an embossment 30 and a bumper 35 whose functions will be explained momentarily.

A spring housing member 31 having a sleeve portion 32 and a latch portion 34 is rotatably mounted on the shaft 20 with the portion 32 extending thru the aperture in plate 24 and abutting against the shaft shoulder 22. A torsion spring 33 is positioned within the housing member 31 and has one end attached to the housing member 31 and the other end fitted into the slot 21 in the shaft 20 so that the housing member is normally biased in a counter-clockwise direction relative to FIGURE 2. The torsion spring, for optimum operating efficiency, should have a number of turns (ten or more) so that substantially the same bias is imparted to the rotating components thru approximately 200 degrees of rotation.

Normally the latch 34 is biased against the embossment 30 on the plate 24 by the spring 33. The face of the spring housing member 31 away from the core 15 is partially closed by a member 36 which abuts against the shaft shoulder 23. The member 36 has therein a central shaft aperture 36' and a plurality of smaller apertures 37. A retaining ring 38 may be utilized to position the spring housing 31 and associated members on the shaft 20. It is to be understood that the latch, sleeve, housing and enclosing members may be constructed in a variety of manners. For example, the latch and sleeve may be an integral piece which also serves to enclose one face of the housing while the enclosing member, as shown (36), may be a separate member.

It can be seen that when the upper portion of the armature plate 24 moves toward the leg of the yoke 15 that engagement between the embossment 30 and latch arm 34 no longer exists. At this time the force exerted by torsion spring 33 will cause the member 31 to rotate about the shaft 20 in a counter-clockwise direction relative to FIGURE 2 until the latch arm 34 impinges upon the bumper 35. The bumper may be a rubber coated metallic stud or similar means which will perform the desired motion-limiting function.

The indicating assembly 12 comprises a casing 39 which is adapted to be attached to the backing member 13 in such a manner as fit over the shaft and components attached thereto. The attachment of the casing and backing member may be accomplished in a variety of ways although simple screw connections are preferred. A shoulder may be provided around the periphery of the casing 39 and a piece of rubber or other type of weather stripping 54 may be positioned so as to encircle the raised portion 14 of the backing member 13. In this manner the casing 39 is affixed to the backing member 13 so that a relatively weather tight seal will exist therebetween.

An enlarged aperture 40 may be provided in the casing 39 directly in line with the spring housing 31. A piece of circular translucent material 41 having a central aperture 42 is placed over the aperture 40 and may be made opaque to the extent of its lower half as by painting or the like.

A reset ring 43 extends on the outside of the window 41 and is pinned to a circular plate 44 (which may be metallic) on the other side of the window 41. The side of the circular plate 44 visible thru the window 41 may be painted an indicating color such as yellow or red to the extent of a semi-circle. A gasket or similar member 55 may be provided to "weather seal" the point of entrance of the reset ring in window 41.

The side of the plate 44 not visible from the window 41 has projecting portions 45 which are set apart the same distance as the apertures 37 in member 31 and which are adapted to be received respectively therein. The reset ring and circular plate are fixed relative to one another and revolvable with respect to the casing 39.

When the projecting portions 45 are received in the apertures 37 and the casing and backing member attached to one another any rotative movement of the member 31 and spring 33 will be transmitted thru the projections to the circular indicating plate and reset ring. So also will any motion initiated by the reset ring 43 be transmitted to the member 31 and spring 33.

The indicating and yoke portions of the device are assembled in such a manner that when the latch arm 34 is biased against embossment 30 (untripped position) the darker or non-indicating portion of the plate 44 is visible thru the window 41. Conversely a tripped latch i.e. one that has moved approximately 180°, will be accompanied by a yellow or red view thru the window.

To place the above described device in service a cable is positioned between the curvate cable clamp 18 and the backing member 13 and the thumb screw 16 tightened to firmly secure the cable to the device. When a fault occurs on the line the current passing thru the cable sets up a magnetic field in the core 15. This field attracts the upper end of the armature member 24 and causes it to move about its basal connection toward the leg of the core member. When the armature moves toward the core the embossment 30 disengages from the latch arm 34 thereby allowing the torsion spring 33 to rotate the housing 31, enclosing member 36 and latch arm 34 until the latch arm impinges upon the bumper 35. Since the indicating plate 44 and spring housing 31 are interconnected the indicator will also rotate 180° thereby exposing the indicating portion to view thru the window 41. As is obvious the device will indicate the existence of both temporary and permanent line fault conditions.

One manner of utilizing the device is to place it on the incoming leads in a pad mounted transformer or similar installation within the housing in an underground distribution system. When a fault occurs between distribution transformers all that need be done is to check the fault indicator at each transformer location. When an untripped device is found the fault will be known to exist between the last tripped and the first untripped device. If the fault was temporary the devices may be merely reset. If the fault is permanent customers previously supplied by the "out transformer" are switched over to an operating transformer. The faulted section of the line is then isolated and may be repaired at a later date.

The device may be mounted either horizontally or vertically on a variety of circuits and would ordinarily be rated to trip on fault currents above 300 or 400 amperes. The minimum trip level can be varied to a wide degree however, by increasing the number of conductor loops thru the core or by increasing the bias of armature 24 by a stronger spring 28 or by an auxiliary spring situated between the core leg and the movable end of the armature plate. The first means of varying trip level would lower the trip level (in terms of fault current) while the second means would raise the fault current level that would serve to trip the device. It is to be noted that if pivot connections other than the spring bolt assemblies 25 were utilized that the trip level of the device would be increased due to the fact that hinge or similar substitute connections, by their very nature, introduce larger air gaps into the magnetic circuit.

Subsequent to tripping of the device on a temporary fault, the upper end of the armature will return to its original position spaced apart from the core leg. The device may be reset by turning the reset ring 43 which will cause the spring and spring housing 31 and latch arm 34 to rotate thereby again positioning the arm 34 behind the embossment 30. To facilitate resetting one side of the embossment 30 or one side of latch arm 34 may be chamfered.

Figure 6:
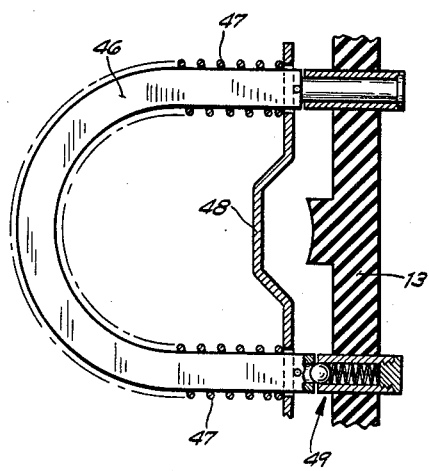
FIG. 6 is a partially cutaway view in elevation of another slightly modified form of the device.

FIG. 6 discloses an embodiment of the invention which is generally similar to that of FIGS. 1 and 2 but which may be affixed with greater facility to a line.

The structure which makes this possible includes a U-shaped core member 46 which may be of substantially circular cross-section and which is pivotally connected at one leg to a backing member 13. A spring 47 surrounds most of the core and acts to bias a non-magnetic cable clamping member 48 toward the backing member 13. The other leg of the core member is rotatable about the first leg and is normally releasably affixed to the backing member via a ball and spring joint connection 49 on the backing member. The type of connection utilized between said other leg of the core member and the backing member may differ from the one described as long as it performs the function of locking the leg against the backing member when the leg is swung thereagainst and the function of permitting disengagement between the leg and backing member when a moderate force is applied to accomplish same. The cable clamping member 48 may also differ from that shown as long as it is compatible with hook or hot stick operation.

The advantage of this particular modification lies in the fact that the one leg of the core may be swung away from the backing member preparatory to placing the device on, for example, an overhead line. The device may then be put on the end of a special hook stick (not shown) and placed on the line. The hook stick then may be manipulated in such a manner that the movable leg of the core becomes latched to the backing member thereby firmly attaching the device to the line. The fact that the core is movable with respect to the backing member thereby aids the installation of the device.

Figure 3:
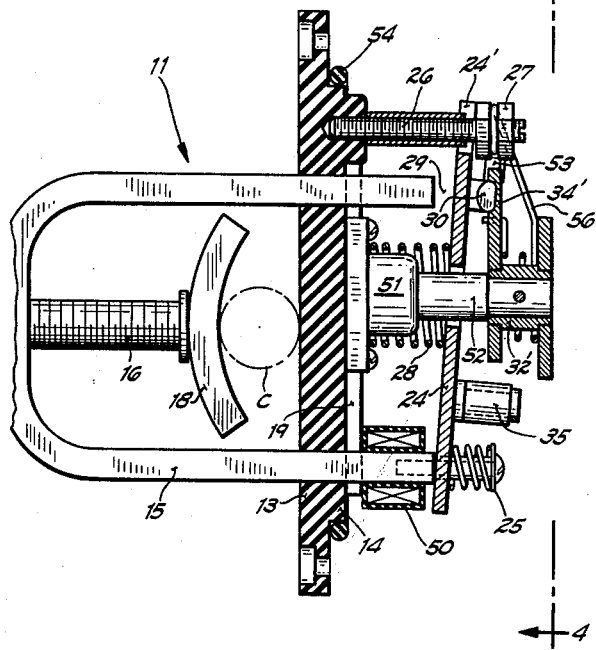
FIG. 3 is a partially cutaway view in elevation of a somewhat modified form of the device.
Figure 4:
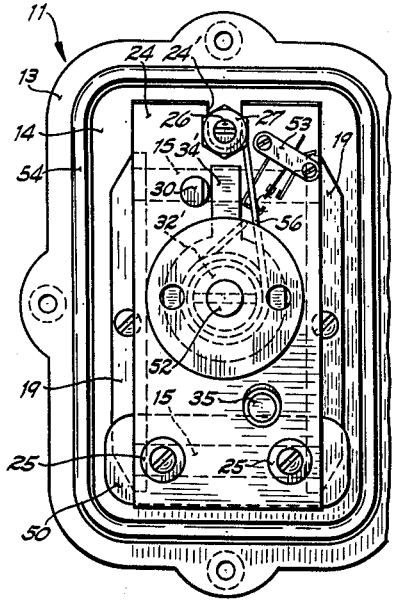
FIG. 4 is a frontal elevation view of a portion of the device of FIG. 3 taken along lines 4—4 of FIG. 3.

In FIGS. 3 and 4 another modified form of the device is shown which differs slightly from the foregoing embodiments in that an automatic resetting mechanism is provided so that the device will reset itself on temporary faults. The device of FIGS. 3 and 4 has an electrical coil 50 which may be associated with the projecting portion of the yoke 15 and a low voltage series motor 51 mounted on the casing backing member 13 so that motor operation will occasion rotation of the motor shaft 52. The coil could also be mounted any place on the magnetic circuit (leg of the yoke, armature) but it is preferred that it not be exposed to the atmosphere. The latch 34' and sleeve member 32' are fixed relative to the shaft 52. The spring 56 of FIG. 3 is the counterpart of spring 33 in FIGS. 1 and 2 and serves to bias the shaft 52 and sleeve 32' and latch 34' in a counter-clockwise direction relative to FIG. 4. (Note that in this embodiment the shaft also rotates in response to spring force once the air gap 29 has been closed.)

Figure 5:
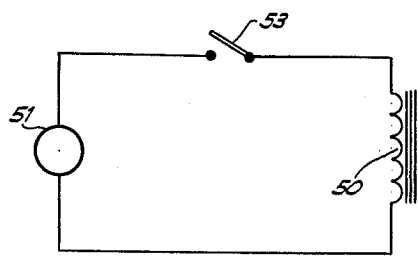
FIG. 5 is a diagram of the motor circuit of the device of FIG. 3.

A switch 53 which may be of the single pole variety is also placed on the backing member in series relation with the low voltage series motor and coil (FIG. 5). The switch is so designed that it will be open when the latch arm 34' is biased behind the embossment 30 and it will be closed when the arm 34' is in tripped position resting against the bumper 35.

The operation of the device in tripping under a fault current is generally similar to the operation of the previously described device with the difference being that the shaft, arm, sleeve and spring rotate as a unit. However, if the fault was temporary in nature, upon the restoration of line current, a voltage will be induced in the coil 50 which causes the motor to rotate the shaft and everything affixed thereto to the point where the arm 34' is again positioned behind the embossment 30. Additional clockwise rotation (relative to FIG. 4) of the motor is prevented since the switch 53 is opened as a result of latch 34' impinging thereupon thereby opening the motor-coil circuit. In the case of a permanent fault the motor would not operate since no voltage would be induced in the coil.

As can be seen this particular device has the capability of distinguishing between temporary and permanent faults. A particular application of the device would be in conjunction with a three phase recloser or circuit breaker to indicate a permanently faulted phase.

While three particular embodiments of the invention have been shown and described, it will be obvious to those skilled in the art that various changes and modifications can be made therefrom without departing from the invention and therefore, it is intended for the appended claims to cover all such changes and modifications as fall within the true spirit and scope of the invention.

I claim:

1. An electromagnetic fault indicator comprising, in combination, a casing having a transparent window therein and including a non-magnetic base member having a pair of spaced apart apertures therein, a generally U-shaped magnetic core having the legs thereof extending through said apertures in said base member, clamping means engaging said core for mounting said indicator on a conductor extending through the loop formed by said U-shaped core and said base, a movable armature within said casing adjacent the free end of said core legs, whereby said armature is protected against corrosion resulting from exposure to the atmosphere, spring means within said casing for holding said armature in spaced relation to said core, whereby an air gap is provided between said armature and said core, a member within said casing rotatable between first and second positions, resilient means within said casing for biasing said rotatable member toward rotation from said first to said second position, latch means within said casing controlled by said armature for normally holding said rotatable member in said first position, means including an indicating member within said casing visible through said window and coupled to and movable with said rotatable member for giving a visual indication upon rotation with said rotatable member from said first to said second position, said latch means freeing said rotatable member for movement upon attraction of said armature to said core in response to a predetermined current through said conductor, said indicating member having a portion extending through a wall of said casing and being engageable by a hookstick and permitting return of said indicating member and said rotatable member against the bias of said resilient means from said second to said first position and said latch means being resettable to again hold said rotatable member against movement after it is returned to said first position.

2. A fault indicator in accordance with claim 1 wherein said U-shaped magnetic core has a joint openable to permit insertion of said core over said conductor.

3. An electromagnetic fault indicator comprising, in combination, a generally U-shaped magnetic yoke adapted to straddle a power line conductor, clamping means engaging said yoke for mounting said indicator on said conductor, a movable armature having an aperture adjacent one end thereof, means including a member affixed to one leg of said U-shaped yoke extending with a loose fit through said aperture in said armature and a spring surrounding said member and urging said one end of said armature into engagement with said yoke for pivotally mounting said one end of said armature on said one leg of said yoke, resilient means for holding the other end of said armature in spaced relation to said yoke, whereby an air gap exists between said armature and said yoke, a member rotatable between first and second positions, means including an indicating member coupled to and movable with said rotatable member for giving a visual indication upon rotation with said rotatable member from said first to said second position, spring means for biasing said rotatable member toward movement from said first to said second position, latch means controlled by said armature for normally holding said rotatable member in said first position, said latch means being adapted to free said rotatable member for movement upon attraction of said armature to said yoke in response to a predetermined magnetic flux in said yoke, whereby a predetermined fault current in said conductor will effect movement of said indicating member to give a visual indication, and resetting means engageable by a hookstick for returning said indicating member from said second to said first position against the bias of said spring means, said latch means being adapted to again hold said rotatable member against movement after it is returned to said first position.

4. A fault indicator in accordance with claim 3 wherein said magnetic yoke has a joint which is openable to insert said yoke over said conductor.

5. An electromagnetic fault indicator comprising, in combination, a casing having a transparent window, a magnetic core adapted to straddle a conductor exterior of said casing and extending through a wall of said casing into the interior of said casing, clamping means engaging said core for mounting said indicator on said conductor, an armature within said casing adjacent said core, whereby said armature is protected from corrosion caused by exposure to the atmosphere, said armature and said core having an air gap therebetween, a member within said casing rotatable between first and second positions, an indicator within said casing coupled to and movable with said rotatable member between said first position wherein said indicator is not visible within said window and said second position wherein said indicator is visible within said window, resilient means within said casing for biasing said rotatable member toward rotation from said first to said second position, latch means within said casing controlled by said armature for normally holding said rotatable member in said first position and freeing said rotatable member upon movement of said armature into engagement with said core in response to a predetermined overcurrent in said line conductor, and means including an element connected to said indicator and extending through a wall of said casing and being engageable by a hookstick and accessible from the exterior of said casing for returning said rotatable member from said second to said first position.

6. An electromagnetic fault indicator comprising, in combination, a protective casing including a non-magnetic base member having a pair of spaced apart apertures therethrough, generally U-shaped magnetic core means having the legs thereof extending through said apertures into the interior of said casing, adjustable clamping means threadably engaging said core means for mounting said indicator on a power line conductor extending through said U-shaped core means, a movable armature within said casing adjacent the open end of said core means, spring means for holding said armature in spaced relation to said core means, whereby an air gap is provided between said armature and said core means, a member within said casing rotatable between first and second positions, resilient means for biasing said rotatable member toward rotation from said first to said second position, latch means operated by said armature for normally holding said rotatable member in said first position, said casing having a transparent window therein, a normally invisible indicator within said casing coupled to and movable with said rotatable member, said indicator giving a visual indication through said window when said rotatable member is moved to said second position, said latch means freeing said rotatable member for movement upon attraction of said armature to said core means in response to a predetermined overcurrent through said conductor, and a reset ring adapted to be engaged by a hookstick and being accessible from the exterior of said casing and having a portion extending through said casing so as to be rotatable relative to said casing and engaging said indicator member and permitting return of said rotatable member to said first position.

7. A fault indicator in accordance with claim 6 wherein said generally U-shaped core means has a joint which is openable to permit linking said core means with said power line conductor.

8. An electromagnetic fault indicator comprising, in combination, a casing having a transparent window and also having a pair of spaced apart apertures in a wall thereof, a generally U-shaped magnetic core adapted to straddle a power line conductor and having the core legs extending through said apertures into the interior of said casing and also having a cooperating movable armature within said casing adjacent the core open end, said core and cooperating armature having an air gap therebetween, clamping means engaging said core for mounting said fault indicator on said conductor, a member within said casing rotatable between first and second positions, an indicator within said casing coupled to and movable with said rotatable member between said first position wherein said indicator is not visible within said window and said second position wherein said indicator is visible within said window, resilient means for biasing said member toward rotation from said first to said second position, latch means within said casing interengaging said armature and said rotatable member and normally holding said rotatable member in said first position, said latch means freeing said rotatable member upon movement of said armature into engagement with said core in response to a predetermined overcurrent in said line conductor, and means for automatically returning said rotatable member from said second to said first position in response to the restoration of normal current in said conductor after said predetermined overcurrent in said conductor has moved said armature into engagement with said core.

9. An electromechanical fault indicator for indicating overcurrent on a power line conductor comprising, in combination, a non-magnetic base member having a pair of spaced apart apertures therethrough, a U-shaped magnetic core adapted to straddle said power line conductor and having the legs thereof protruding through said apertures, clamping means engaging said core for mounting said indicator upon said conductor, a movable armature cooperating with and adjacent the open end of said magnetic core, said core and said armature having an air gap therebetween, a member rotatable between first and second positions, resilient means for biasing said member toward rotation from said first to said second position, latch means controlled by said armature for normally holding said rotatable member in said first position, a casing defined partially by said base member and enclosing said armature and said rotatable member and having a transparent window therein, said latch means freeing said rotatable member upon attraction of said armature to said magnetic core in response to a predetermined overcurrent in said conductor, indicator means coupled to and movable with said rotable member to a position within said casing visible through said window when said rotatable member is actuated from said first to said second position, means for returning said rotatable member from said second to said first position in response to restoration of normal current in said line including electromotive means for actuating said rotatable member, an energy deriving coil linking said core and connected in a circuit with said electromotive means, and a switch actuated by said rotatable member and adapted to open the circuit between said coil and said electromotive means when said rotatable member is in said first position and to close said circuit when said rotatable member is in said second position.

10. An electromagnetic fault indicator comprising, in combination, a generally U-shaped magnetic core adapted to straddle a conductor, a movable armature, means for supporting said armature adjacent the open end of said core, resilient means for holding said armature in spaced relation to said core, whereby an air gap exists between said armature and said core, a member rotatable between first and second positions, means including an indicating member coupled to and movable with said rotatable member for giving a visual indication upon rotation with said rotatable member from said first to said second position, spring means for biasing said rotatable member toward movement from said first to said second position, latch means interengaging said armature and said rotatable member and normally holding said rotatable member in said first position, said latch means being adapted to free said rotatable member upon attraction of said armature to said core in response to a predetermined overcurrent in said conductor, electromotive means for returning said rotatable member from said second to said first positions, said latch means being adapted to again hold said rotatable member against movement after it is returned to said first position, coil means linking said magnetic core and connected in circuit with said electromotive means for energizing said electromotive means, and switch means in said circuit between said electromotive means and said coil means and operated by said rotatable member and adapted to open said circuit when said rotatable member is in said first position and to close said circuit when it is in said second position, whereby said indicating member is actuated to a position where it gives a visual indication in response to a predetermined fault current in said conductor and the voltage induced in said coil upon restoration of said current in said conductor to normal following a temporary fault energizes said electromotive means to return said rotatable member from said second to said first position.

11. An electromagnetic fault indicator, comprising, in combination, a non-magnetic base having a pair of apertures therethrough, a generally U-shaped magnetic core adapted to straddle a conductor and having its legs extending through said apertures, a movable armature cooperative with said core and being disposed adjacent the core open end, said core and armature having an gap therebetween, clamping means engaging said core for mounting said indicator on said conductor, a member rotatable between first and second positions, resilient means for biasing said rotatable member for movement from said first to said second position, latch means controlled by said armature for normally holding said rotatable member in said first position, indicator means coupled to and movable with said rotatable member, a protective casing defined partially by said base member and enclosing said armature and said indicator means and having a transparent window, said latch means being actuated upon movement of said armature into engagement with said core in response to a predetermined overcurrent in said line conductor to free said rotatable member for movement, rotation of said rotatable member from said first to said second position moving said indicator means into visible position adjacent said window, and means for automatically returning said rotatable member from said second to said first position in response to the restoration of normal current in said conductor after said predetermined overcurrent has moved said armature into engagement with said core.

12. An electromagnetic fault indicator comprising, in combination, a generally U-shaped magnetic core adapted to straddle a power line conductor, a movable armature cooperating with and adjacent the open end of said core, indicator means movable between visible and non-visible positions, resilient means for biasing said indicator means toward movement from said visible to said non-visible position, latching means controlled by said armature for holding said indicator means in said non-visible position when normal current is flowing in said conductor and being operated by said armature in response to a predetermined overcurrent in said conductor to free said indicator means, coil means linking said magnetic core, and electromotive means energized from said coil means for returning said indicating means from said visible to said non-visible position in response to the return of the current in said conductor to normal after said latch means has freed said indicator means incident to said predetermined overcurrent in said conductor.

References Cited by the Examiner
UNITED STATES PATENTS

| | | | |
|---|---|---|---|
| Re. 20,290 | 3/37 | Stanton | 324—129 |
| 350,450 | 10/86 | Tucker | 340—280 |
| 521,046 | 6/94 | Ross | 340—376 |
| 569,960 | 10/96 | Drake | 317—22 XR |
| 869,728 | 10/07 | Paisley | 340—281 |
| 914,235 | 3/09 | Brown | 340—376 |
| 1,068,253 | 7/13 | Luther | 340—281 |
| 1,692,216 | 11/28 | Leece | 317—13 |
| 1,934,264 | 11/33 | Hefner | 340—253 |
| 2,012,650 | 8/35 | Yrisarri | 340—376 |
| 2,013,241 | 9/35 | Hefner | 340—253 |
| 2,709,800 | 5/55 | Temple et al. | 340—253 |
| 2,716,216 | 8/55 | Schwenzfeier | 324—133 |

NEIL C. READ, *Primary Examiner.*

RUDOLPH V. ROLINEC, *Examiner.*